(12) United States Patent
Rombold

(10) Patent No.: US 8,783,407 B2
(45) Date of Patent: Jul. 22, 2014

(54) STEERING SYSTEM HAVING A HYDRAULIC STEERING COLUMN

(75) Inventor: Manfred Rombold, Winnenden-Hofen (DE)

(73) Assignee: ThyssenKrupp Presta AG, Eschen (LI)

( * ) Notice: Subject to any disclaimer, the term of this patent is extended or adjusted under 35 U.S.C. 154(b) by 61 days.

(21) Appl. No.: 13/577,164

(22) PCT Filed: Nov. 24, 2010

(86) PCT No.: PCT/EP2010/007111
§ 371 (c)(1),
(2), (4) Date: Aug. 3, 2012

(87) PCT Pub. No.: WO2011/103892
PCT Pub. Date: Sep. 1, 2011

(65) Prior Publication Data
US 2012/0305328 A1 Dec. 6, 2012

(30) Foreign Application Priority Data

Feb. 25, 2010 (DE) .......................... 10 2010 009 362

(51) Int. Cl.
*B62D 5/00* (2006.01)
*B62D 3/14* (2006.01)

(52) U.S. Cl.
CPC . *B62D 3/14* (2013.01); *B62D 5/003* (2013.01)
USPC ...................................................... 180/403

(58) Field of Classification Search
USPC ........................... 180/402, 403, 421, 422, 423
See application file for complete search history.

(56) References Cited

U.S. PATENT DOCUMENTS

| | | | |
|---|---|---|---|
| 5,862,878 A * | 1/1999 | Bohner et al. | 180/403 |
| 6,244,371 B1 * | 6/2001 | Bohner et al. | 180/403 |
| 6,945,353 B2 * | 9/2005 | Bishop | 180/446 |
| 7,306,070 B2 * | 12/2007 | Kobayashi | 180/406 |
| 7,380,827 B2 * | 6/2008 | Bannon | 280/777 |
| 2011/0094820 A1 | 4/2011 | Bootz et al. | |

FOREIGN PATENT DOCUMENTS

| | | |
|---|---|---|
| DE | 19838490 A1 | 12/1999 |
| DE | 10 2008 021973 A1 | 11/2009 |
| EP | 2141060 A2 | 1/2010 |
| GB | 2309676 A | 8/1997 |

OTHER PUBLICATIONS

International Preliminary Report on Patentability issued in International Application No. PCT/EP2010/007111 dated Aug. 28, 2012.

(Continued)

*Primary Examiner* — Tony Winner
(74) *Attorney, Agent, or Firm* — Novak Druce Connolly Bove + Quigg LLP

(57) ABSTRACT

The invention relates to a steering system for a motor vehicle, comprising a steering wheel, a steering gear shaft and a hydraulic master unit, the steering gear shaft being in mechanical active connection with the master unit via a toothing, and also comprising hydraulic lines and a hydraulic slave unit in a steering gear which, for swivelling steerable wheels is mechanically coupled therewith, an electronic control for controlling an electric servomotor being provided which is actively connected to the steering gear, the active connection between the steering shaft and the hydraulic master unit being a toothing with a variable transmission.

6 Claims, 2 Drawing Sheets

(56) References Cited

OTHER PUBLICATIONS

Dangelmaier R.O., "Novel tooth system for ZF rack and pinion steering gears made by orbital cold forming," ATZ Automobiltechnische Zeitschrift, Vieweg Publishing, 1995-1996, pp. 16-18, XP000499648, abstract.

International Search Report and Written Opinion issued in PCT/EP2010/007111, mailed Feb. 25, 2010 with English translation of International Search Report.

* cited by examiner

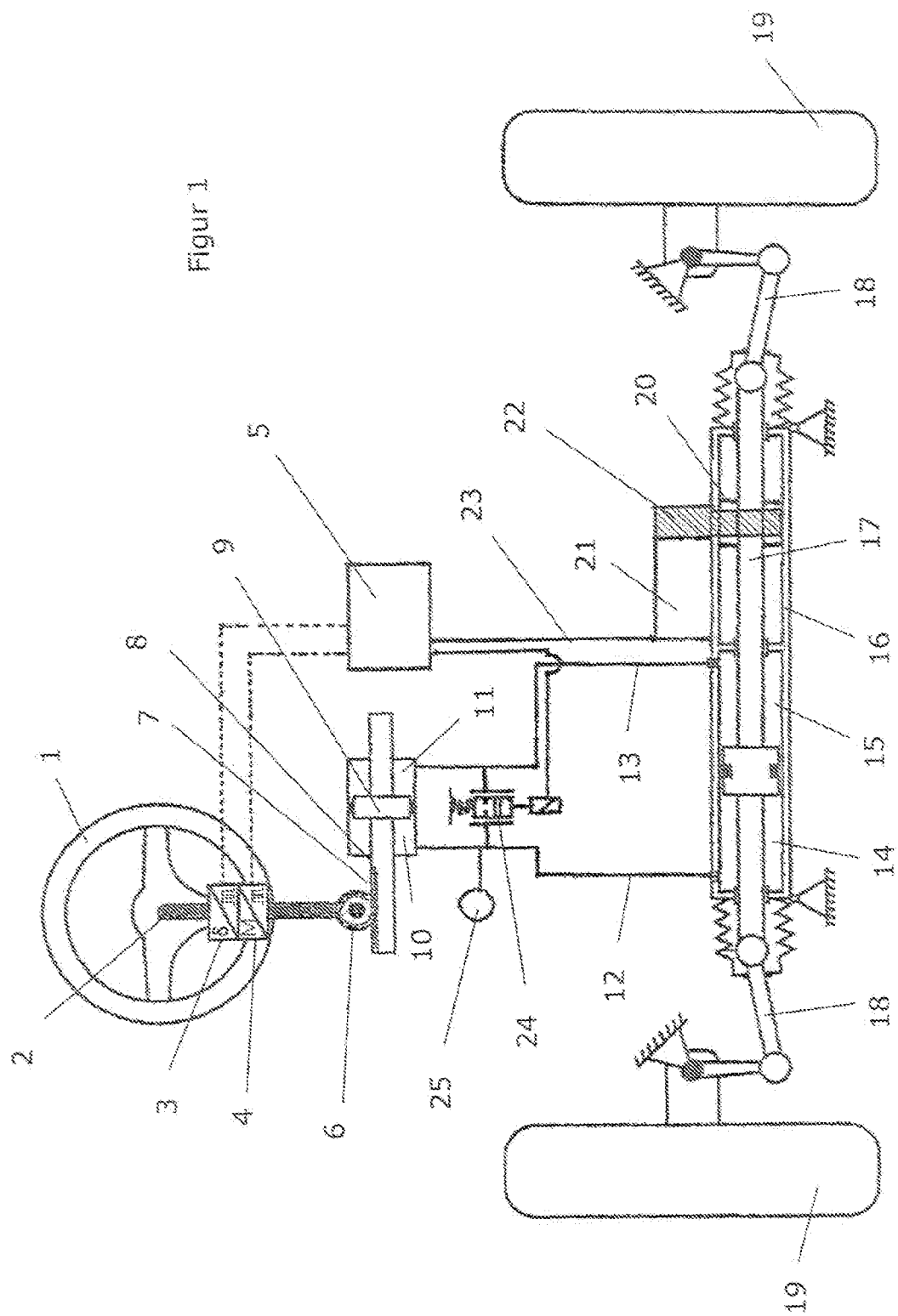
Figur 1

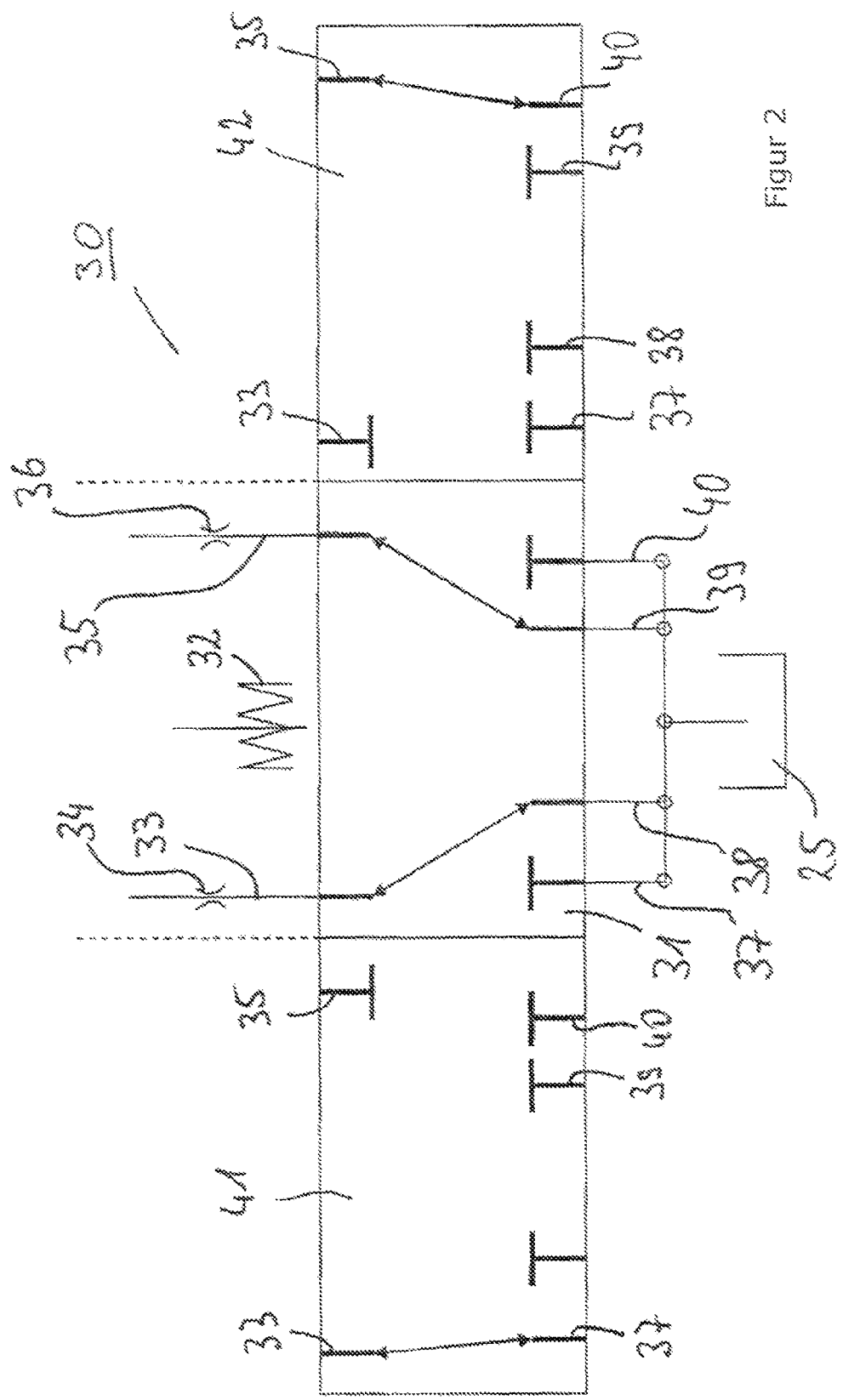
Figur 2

STEERING SYSTEM HAVING A HYDRAULIC STEERING COLUMN

CROSS REFERENCE TO RELATED APPLICATIONS

This application is a National Phase filing under 35 U.S.C. §371 of PCT/EP2010/007111 filed on Nov. 24, 2010; and this application claims priority to Application No. 102010009362.9 filed in Germany on Feb. 25, 2010 under 35 U.S.C. §119; the entire contents of the above are hereby incorporated by reference.

The present invention relates to a steering system, in particular to a steering system for a motor vehicle, having the features of the preamble of claim 1, and to a hydraulic master unit having the features of the preamble of claim 6.

With a few exceptions, steering systems for motor vehicles are presently constructed such that a steering column is a mechanical link from a manually operated steering wheel to a steering gear. The steering gear itself is coupled with the steerable wheels of the vehicle via tie rods and steering knuckles. An electric or hydraulic type of power assisted means is often provided to reduce the actuating forces on the steering wheel and to assist the driver in steering. It is important for driving safety that even if the auxiliary power assistance or servo assistance fails, the vehicle can still be steered by the mechanical coupling between the steering wheel and the steered wheels. This is ensured by the steering column, termed more precisely the steering shaft.

However, various problems are also associated with steering columns. It is mentioned, merely by way of example, that steering columns produce a noise transmission between the engine compartment or the front axle and the passenger compartment.

In the event of a front impact against an obstacle, steering columns are not uncritical as particular precautions have to be taken to prevent them from penetrating into the passenger compartment. Finally, a continuous channel is to be provided for the steering column in the installation space between the steering wheel and the steering gear, which restricts the use of the engine compartment for other components of the vehicle. Consequently, there are various approaches to dispense with the steering column in motor vehicles.

However, in these systems which then also operate an actuator with electric or hydraulic transmission of the steering angle applied by the driver, reliability must also be provided in case the electrical system of the steering fails. This reliability can be produced by the use of a hydraulic positive coupling consisting of a positive displacement unit connected to the steering wheel and of a positive displacement unit provided in the steering gear, the two units having to be coupled by hydraulic lines. Due to the rigidity of such hydraulic drives which is based substantially on the low resilience of the components, of the lines and of the hydraulic fluid itself, a coupling having the necessary characteristics is possible. In this respect, the hydraulic systems are generally to be considered as pure emergency systems which, during normal operation, are rendered inactive by a crossover valve and which are actively connected by closing the crossover valve during a power failure or another disturbance.

The prior art is set out in documents EP 1 213 205 B1, DE 198 01 393 C1, DE 198 38 490 A1 and DE 10 2008 021 973 A1. These documents disclose steering systems with short steering shafts which mesh with a steering rack via a pinion. The steering rack is configured as the piston rod of a piston/cylinder unit which, in turn, is connected to a corresponding piston/cylinder unit of the steering gear. The two units are coupled by hydraulic lines. It is obvious that the displacement of a specific volume on the steering wheel side leads to a corresponding displacement of the piston rod in the steering gear. This connection is linear.

Corresponding master units with a toothed steering rack having a constant transmission ratio are known from documents EP2141060A2 and WO2009/154519A1.

A problem of such steering systems is that power steering systems usually operate with a variable transmission ratio. This is expressed in the fact that around the straight-ahead position, a turning movement of the steering wheel results only in a slight steering deflection of the steered wheels and in this manner the vehicle can be driven in a stable and smooth fashion when travelling straight ahead, for example at high speeds. For greater steering deflections which approach the end stop of the steering gear, the transmission has changed to such an extent that considerable steering lock angles of the steered wheels can be achieved with relatively small turns of the steering wheel. This simplifies and accelerates parking and turning. This variable transmission is a convenience feature for the driver, to which he very quickly becomes accustomed. During operation, this feature is not perceived as a variable transmission, but is associated with the general driving behaviour of the vehicle. The driver learns that there is a specific firm connection between steering lock angles of the steering wheel and specific driving directions and the corresponding change in direction.

If there is a change-over from an electronically controlled power steering configured thus to a hydraulic emergency system due to a failure, as described in the above-mentioned documents, the transmission suddenly changes, since the coupled piston/cylinder units according to the prior art operate linearly, i.e. without the above-described progression in the region of the end stops. In practice, the transmission ratio based on the hydraulic coupling will be selected as an average between the indirect transmission for straight-ahead driving and the direct transmission for great steering angles. Thus, changing over from electronically controlled steering to the hydraulic emergency system results in a change in transmission which can lead to an unsafe driving behaviour due to the habituation, described above, of the driver to the transmission ratios of the steering gear.

This problem is mentioned briefly in the prior art in DE 198 38 490 A1. Here, in respect of the emergency steering operation, it is proposed to allow a variable steering ratio due to a specific configuration of the piston cross sections of the hydraulic piston units. It is not stated how the piston cross sections are to be configured in order to achieve a variable steering ratio of this type.

It is therefore the object of the present invention to provide in a simple manner a variable steering ratio for a generic steering system. This object is achieved by a steering system having the features of claim 1 and by a master unit according to claim 6.

Due to the fact that in a steering system for a motor vehicle comprising a steering wheel, a steering shaft and a hydraulic master unit, where the steering shaft is in mechanical active connection with the master unit via a toothing, and comprising hydraulic lines and a hydraulic slave unit in a steering gear which, for swivelling steerable wheels, is mechanically coupled therewith, the toothed segment has a toothing with a variable transmission, the transmission ratio between the turning of the steering wheel and the path of the piston rod of the master unit can be configured variably in a manner similar to that of a rack steering with a continuous steering shaft. This transmission can be adapted very closely to the transmission, usually used in operation, of the steering system. As far as the driver is concerned, changing over to the hydraulic emergency steering system results in a smaller change in the transmission ratios of the steering and thus in an improved controllability of the motor vehicle in this driving state.

If the hydraulic master unit is a piston/cylinder unit with an axially displaceable piston rod, with the variable toothing being configured as a toothed segment on the piston rod, a reliably operating method which is particularly suitable for the steering system of a motor vehicle can be used.

The provision of the piston rod such that it is guided out of a working chamber of the hydraulic master unit and the arrangement of the toothing (7) in the portion of the piston rod projecting out of the working chamber means that particularly compact dimensions of the hydraulic components are produced.

The steering system also responds to fluctuations in temperature without idle time or dead travel if an expansion tank is provided which communicates with at least one hydraulic line and/or one hydraulic working chamber.

An electrical servo assistance is achieved when an electronic control is provided for activating an electric servomotor which is actively connected to the steering gear.

The features of the dependent claims describe advantageous embodiments of the invention.

In the following, exemplary embodiments of the present invention will be described with reference to the drawings, in which:

FIG. 1: is a schematic view of an electrical steering system with a hydraulic coupling; and FIG. 2: shows an automatic valve for controlling improved pressure compensation in the steering system according to FIG. 1.

FIG. 1 schematically shows a steering system for a motor vehicle. The steering system comprises a steering wheel 1 which is mounted non-rotatably on a steering shaft 2. An angle-of-rotation sensor 3 and a torque sensor 4 detect the angles of rotation and torques which are introduced into the steering shaft 2 and which represent the steering intention of the driver, and forward them to an electronic control 5. The steering shaft 2 is of a short configuration and supports on its end remote from the steering wheel 1 a pinion 6 which engages with a toothing 7 of a piston rod 8. The piston rod 8 supports a hydraulic piston 9 which separates two working chambers 10 and 11 of the piston/cylinder unit formed thereby. The working chambers 10 and 11 are hydraulically connected by hydraulic lines 12 and 13 to working chambers 14 and 15 of a piston/cylinder unit in a steering gear 16. The steering gear 16 comprises the piston rod 17 of the piston/cylinder unit, the piston rod 17 being mounted in a longitudinally displaceable manner in the steering gear 16. The piston rod 17 is installed in a known manner via tie rods 18 to swivel the steerable wheels 19.

In this embodiment, the steering gear 16 also comprises a ball recirculation 20 which is driven by a servomotor 21 via a toothed belt 22. The motor 21 is activated by the control 5 via a signal line 23. A 2/2 way valve 24 is also arranged between the hydraulic lines 12 and 13. The valve 24 can be controlled by the electronic control 5. This is a valve which is closed in the non-operating state and is opened when activated. Finally, an expansion tank 25 is also connected to hydraulic line 12 to be able to compensate temperature-induced fluctuations in volume in the hydraulic system.

During operation, the steering system described thus far works such that in the normal state, the electronic control 5 activates the valve 24 and thereby connects the two hydraulic lines 12 and 13. Thus there is no positive coupling between the working chambers 10 and 11 of the master unit and between the working chambers 14 and 15 of the slave unit, because hydraulic fluid can still flow through valve 24 even when one unit is idle. Consequently, turning the steering wheel 1 does not necessarily result in displacement of the piston rod 17. The electronic control 5 evaluates the signals from sensors 3 and 4 and activates the servomotor 21 which rotates the ball recirculation 20 via the toothed belt 22. A spindle thread (not shown) on the piston rod 17 then converts the rotational movement of the ball recirculation into a longitudinal movement of the piston rod 17 which results in a swivelling motion of the wheels 19. It is known that numerous steering functions can be realised electronically in this manner, thus also for example automatic steering procedures which can be used for keeping in lane or for automatic parking. However, a variable steering ratio can also be simulated by the electronics.

It is not shown in FIG. 1 that the steering shaft 2 can also be connected to a servomotor for a simulated manual movement of the steering wheel. A motor of this type can also be provided to assist the rotational movement of the steering shaft 2 to compensate a possible sluggishness of the hydraulic master unit.

In the event of disruption, for example if the control 5 is without current, the valve 24 goes into the closed state. This entails a clear and rigid coupling of working chambers 10 and 11 to working chambers 14 and 15. Turning the steering wheel 1 and the steering spindle 2 produces a linear movement of the piston rod 8 and of the piston 9 via the pinion 6 and the toothing engagement 7. Consequently, one working chamber is reduced in size and the other working chamber is increased in size in a known manner. The hydraulic fluid displaced from the diminished working chamber flows through the respective hydraulic line 12 or 13 into the correspondingly associated working chamber 14 or 15 so that the piston rod 17 moves. The driver then has a practically rigid control of the steered wheels via this functional chain.

Since in the case of known piston/cylinder units, the cylinder bore has a constant diameter, there is a linear connection between the stroke of piston rod 8 and the stroke of piston rod 17. To achieve the initially mentioned variable steering ratio, the invention provides that the toothing in the engagement of the pinion 6 in the toothed segment 7 is a variable toothing, so that for example in the central position, shown in FIG. 1, of the steering shaft 2 and of the piston rod 8, an indirect transmission is ensured in which turning the steering wheel 1 produces only a slight linear movement of piston rod 8, whereas in the end positions of the toothing 7, the transmission is more direct, so that in these positions the same relative turning movement of the steering wheel 1 produces a pull and stroke of the piston rod 8. It is thus also ensured during hydraulic emergency operation that the transmission ratio corresponds approximately to that realised by the electronically operated steering system. Therefore, when changing over into emergency operation, there is no sudden change in transmission for the driver. In this respect, the driving behaviour of the vehicle remains substantially unchanged and thus predictable for the driver.

In a simpler embodiment (not shown), the valve 24 can be omitted. As a result, the control 5 can also be simplified since it is possible to dispense with the programming and electronic control of the valve.

For the steering itself, the omission of the valve means that there is a permanent positive coupling between the working chambers 10 and 14 and also between the working chambers 11 and 15. In this respect, the hydraulics replaces the steering shaft known from conventional electromechanical power steering systems. The steering wheel is not uncoupled from the steering gear. Nevertheless, a steering system with a variable steering ratio is produced due to the variable toothing on the master unit.

The advantages mentioned at the beginning and resulting from the omission of the rigid steering shaft are also provided with this simplified embodiment.

Numerical values for the transmission ratios between the rotational movement of the steering shaft 2 and the linear movement of the piston rod 8 and the piston 9 are also provided by way of example. A transmission ratio of 50 mm per 360° is presently preferred for straight-ahead travel, i.e. for example with angles of rotation of 90° to 180° to the left or to the right from the straight-ahead position. Towards the end stops, the transmission should then increase until a transmission of approximately 65 mm per 360° is attained. The actual transmission ratios naturally depend on the ratio of the diameters of the coupled hydraulic chambers and other external factors.

Finally, a detailed description of the expansion tank 25 will be provided.

This expansion tank cannot be configured as a simple equalising tank with a diaphragm and a gas filling, because the gas filling would have to have a pressure which is above the operating pressure which is to be expected within the hydraulic system. This would result in a permanent high pressurisation of the hydraulics, which is generally undesirable. When subjected to a low torque which is to be predominantly expected in practice, the hydraulic steering system is on average almost without pressure.

The problem is solved in a simple embodiment in that the expansion tank is provided with a diaphragm and a volume of gas and is connected to the hydraulic system by two connections. One connection is configured as a throttling port which only allows an extremely small amount of hydraulic fluid to pass through, as is to be expected during a rise in pressure due to a slow change in temperature. A sudden rise in pressure which occurs as a result of a steering movement in the hydraulic system is not discharged through this throttling port. Thus, this throttling port ensures that in spite of the compensating ability in respect of temperature-induced fluctuations in volume, the steering gear reacts spontaneously at any time to steering movements at the master unit. The second connection between the expansion volume and the hydraulic system is realised by a check valve. This check valve opens at the moment when the pressure in the expansion tank is greater than in the hydraulic system. Thus, the check valve allows hydraulic fluid to be suctioned back upon a reduction in volume, as can happen due to cooling of the hydraulic system. The check valve has a larger passage cross section than the throttling port. In this manner, it is considered that cooling procedures in a motor vehicle can take place faster in practice than heating procedures. For example, cooling can take place at a very fast rate if a steering unit which is warm or hot in operation is cooled within seconds to ambient temperature during a sudden passage through water. It would not be possible for this cooling procedure to be compensated by the throttling port.

FIG. 2 shows an improved embodiment of the pressure compensation. This figure schematically illustrates a sliding valve 30 by a circuit symbol. The valve 30 has a schematically illustrated slide 31 which is pre-tensioned in the central position by a spring 32. The valve 30 is connected by a first port 33 via a throttling port 34 to the hydraulic line 12 from FIG. 1 or to a working chamber which communicates with this hydraulic line. A second port 35 of the valve 30 is also connected via a throttling port 36 to the hydraulic line 13 or to one of the working chambers connected thereto.

On the other side of the slide 31, the valve 30 is connected to two ports 37 and 38 which are associated with port 33. Further ports 39 and 40 are associated with port 35. The four ports 37, 38, 39 and 40 communicate with the expansion tank 25 from FIG. 1.

In the central position of the valve 30 shown in FIG. 2, the ports of the valve are connected such that the port 33 is connected to the port 38 and, via this port, is connected to the compensation tank 25. The port 35 is connected to the port 39 and, in turn, the port 39 is connected to the expansion tank 25. Therefore, a change in volume in the hydraulic line 12 and in the hydraulic line 13 results in a change in the volume in the expansion tank 25.

If the slide 31 is moved to the right, the connection position denoted by reference numeral 41 is adopted. This position is adopted automatically in that the working chamber 11 and thus the hydraulic line 13 are pressurised. This pressure displaces the slide 31 against the restoring force of spring 32. As a result, the connection between the port 35 and the port 39 is interrupted. The port 35 is completely closed. There is no longer a connection with the expansion tank 25. On the other side, the port 33 is connected to the port 37. Consequently, hydraulic line 12 remains connected to the expansion tank 25.

During a movement of the steering wheel 1 in the opposite direction, the working chamber 10 is pressurised, as is the hydraulic line 12. As a result, the slide 31 is moved into the connection position 42. In this connection position, the ports 33 and 37 and respectively 38 are disconnected. There is no longer a connection between the hydraulic line 12 and the expansion tank 25. The build-up of pressure in the line 12 does not then result in a flow into the expansion tank 25. On the other side, the port 35 is connected to the port 40 and, via this connection, is connected to the expansion tank 25. A reduction in pressure in the system then results on this side in an equalisation with the expansion tank 25.

As a result, two different things are thus achieved, namely first of all that in the central position, both hydraulic lines 12 and 13 are interconnected via the expansion tank 25 and a change in volume in both partial circles of the hydraulic system can be equalised. On the other hand, if the steering is actuated in the one or other direction, the pressurised side of the hydraulic system is cut off from the expansion tank 25, so that the pressure can build up in this system spontaneously and continuously. This is advantageous for a direct steering feeling and a direct conversion of the steering movement into a turn of the wheels 19. In this operating state, the respectively unpressurised side is connected to the expansion tank 25 and can perform a volume equalisation, i.e. it can either discharge hydraulic fluid into the expansion tank 25 or suction back hydraulic fluid out of the expansion tank 25.

In the illustration of FIG. 1, the valve 30 can be provided in the location of the valve 24, for example, if the valve 24 is omitted. It is completely automatic, controlled merely by the pressure in the hydraulic lines 12 and 13. An electronic control is not required for this valve.

LIST OF REFERENCE NUMERALS

1. Steering wheel
2. Steering shaft
3. Angle-of-rotation sensor
4. Torque sensor
5. Electronic control
6. Pinion
7. Toothing
8. Piston rod
9. Hydraulic piston 10. Working chamber
11. Working chamber
12. Hydraulic line
13. Hydraulic line
14. Working chamber
15. Working chamber
16. Steering gear
17. Piston rod
18. Tie rods
19. Steerable wheels
20. Ball recirculation
21. Servomotor
22. Toothed belt
23. Signal line
24. 2/2 way valve
25. Expansion tank
30 Slide valve
31. Slide
32. Spring
33. Port
34. Throttling port
35. Port
36. Throttling port
37. Port
38. Port
39. Port
40. Port
41. Connection position

I claim:

1. A steering system for a motor vehicle comprising:
a steering wheel.
a steering shaft,
a hydraulic master unit, the steering shaft being in mechanical active connection with the master unit via a toothing,
hydraulic lines, and
a hydraulic slave unit in a steering gear mechanically coupled to swivelling steerable wheels and coupled by the hydraulic lines to the hydraulic master unit,
wherein the active, connection between the steering shaft arid the hydraulic master unit is a toothing with a variable transmission ratio.

2. The steering system according to claim 1, wherein the hydraulic master unit comprises a piston/cylinder unit with an axially displaceable piston rod, and wherein the toothing is a variable toothing configured as a toothed segment on the piston rod.

3. The steering system according to claim 1, wherein the hydraulic master unit comprises a piston rod guided out of a working chamber of the hydraulic master unit, and wherein the toothing is arranged in a portion of the piston rod projecting out of the working chamber.

4. The steering system according to claim 1, further comprising an expansion tank configured to communicate with at least one of the hydraulic lines or with at least one hydraulic working chamber.

5. The steering system according to claim 1, further comprising an electronic control configured to control an electric servomotor, wherein the electronic control is actively connected to the steering gear.

6. A hydraulic master unit of a hydraulic steering system, comprising:
a piston/cylinder unit having a piston rod; and
an input-side steering shaft which is in mechanical active connection with the piston rod via a toothing wherein the toothing has a variable transmission ratio.

* * * * *